March 3, 1959 A. G. HUPP 2,875,720
POWER BOAT ADAPTED TO BE PLANED ON WATER
Filed April 10, 1956 3 Sheets-Sheet 1
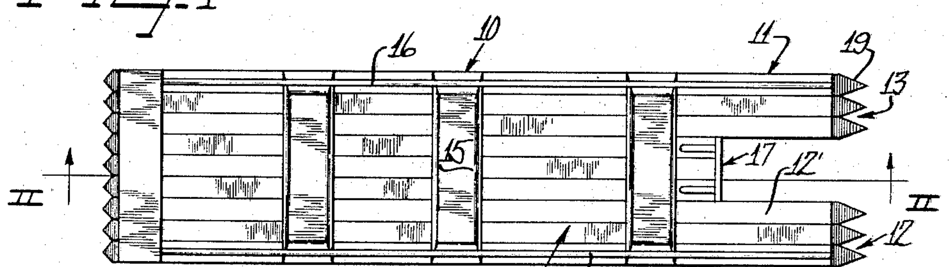
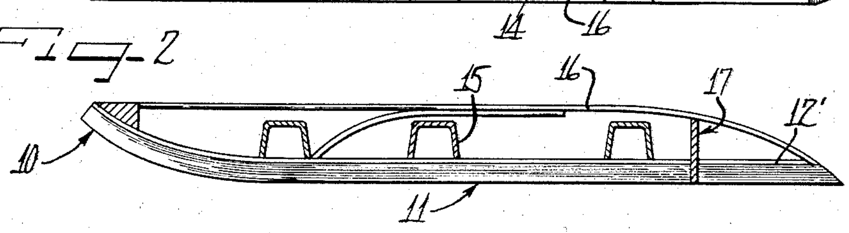
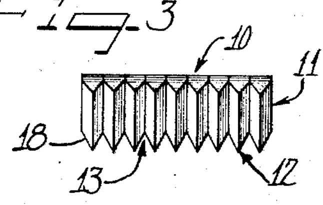
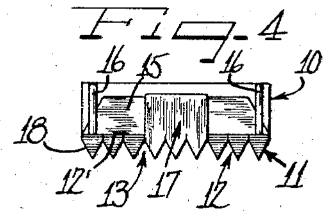
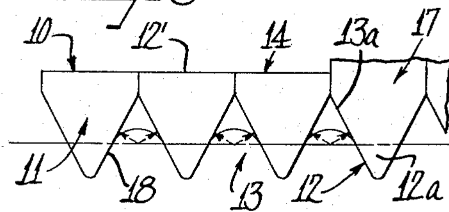
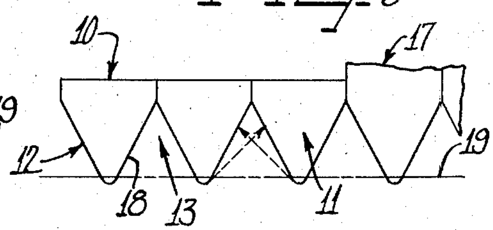
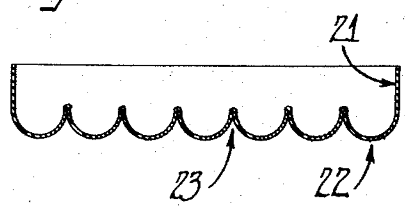
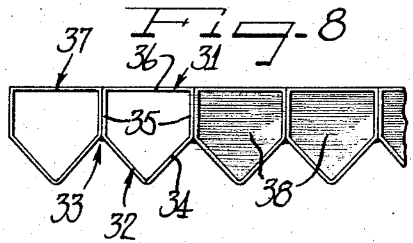
Inventor
Arleigh G. Hupp
by Hill, Sherman, Meroni, Gross & Simpson Attys POWER BOAT ADAPTED TO BE PLANED ON WATER
Filed April 10, 1956
3 Sheets-Sheet 2
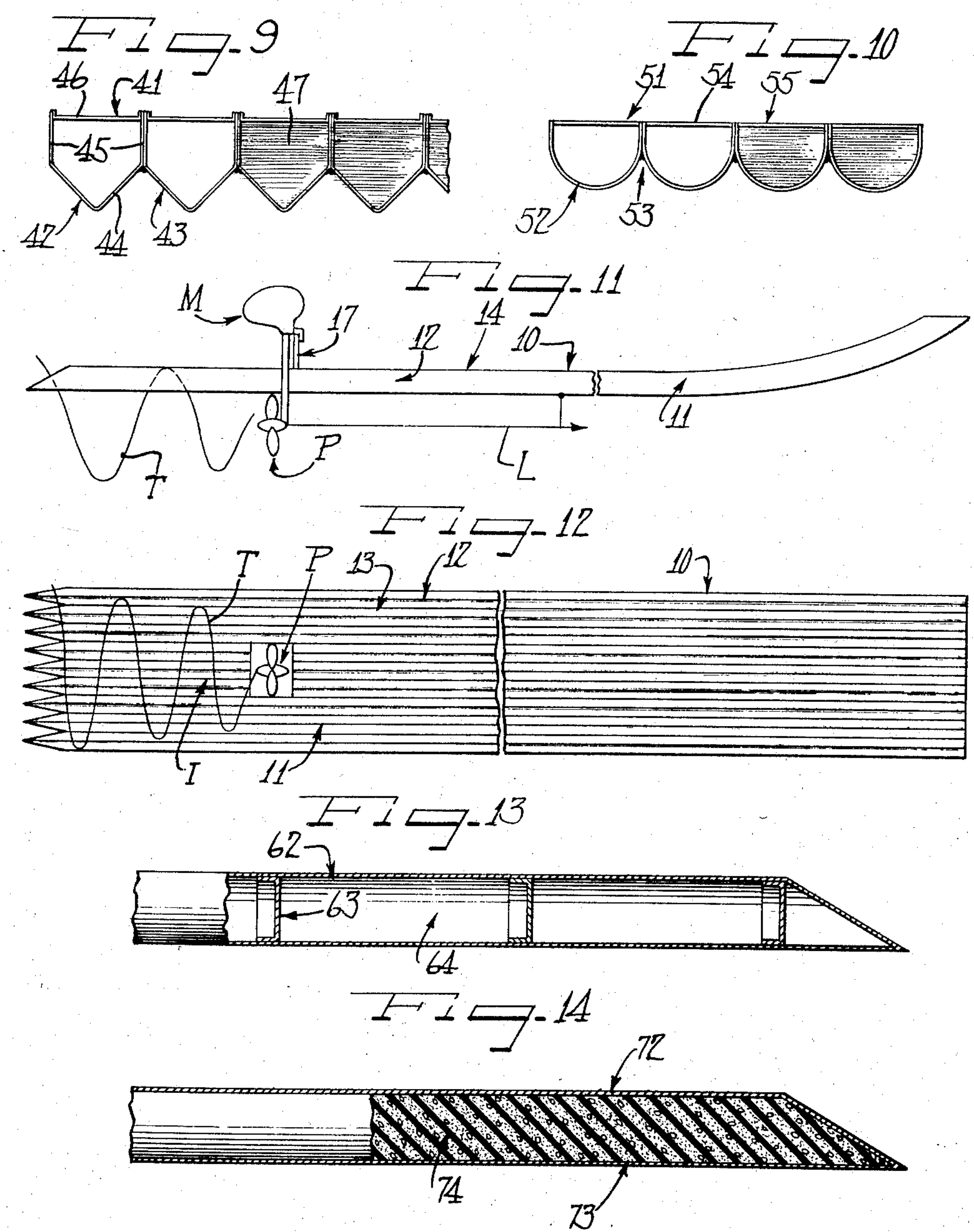
Inventor
Arleigh G. Hupp
by Hill, Sherman, Meroni, Gross & Simpson Attys March 3, 1959 A. G. HUPP 2,875,720
POWER BOAT ADAPTED TO BE PLANED ON WATER
Filed April 10, 1956 3 Sheets-Sheet 3
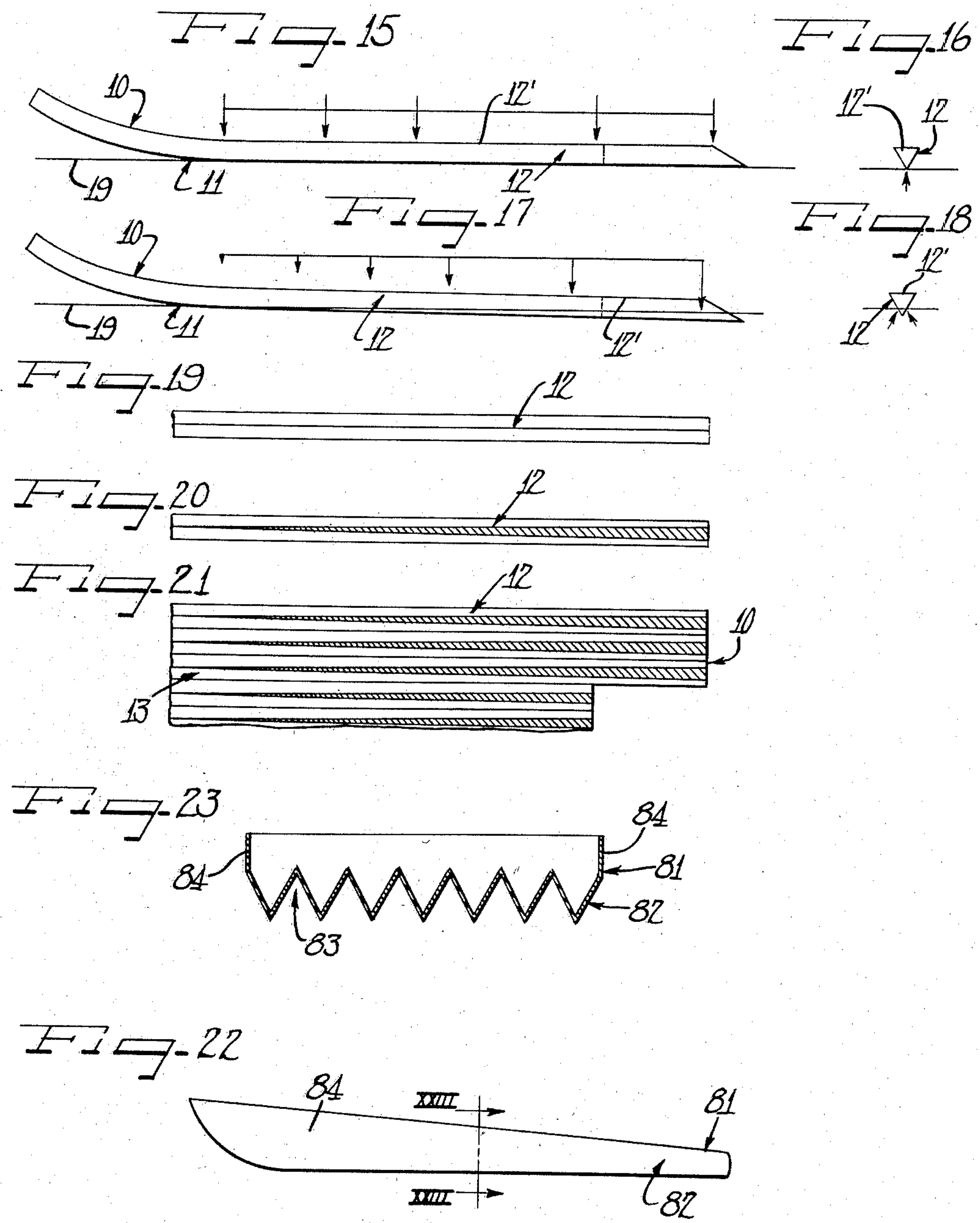
Inventor
Arleigh G. Hupp
by Hill, Sherman, Meroni, Gross & Simpson Attys United States Patent Office 2,875,720

Patented Mar. 3, 1959

2,875,720

POWER BOAT ADAPTED TO BE PLANED ON WATER

Arleigh G. Hupp, Bloomington, Ill.

Application April 10, 1956, Serial No. 580,156

1 Claim. (Cl. 114—66.5)

This invention relates generally to a new and improved water vehicle construction which is adapted to be powered along a water surface and is preferably in the form of a boat.

An object of this invention is to provide a boat bottom comprising a number of closely confined channels through which, when the boat is set in forward motion, the flow of a substantial portion of a wall of water accruing from the projected water displacement of the boat is channeled for the purpose of passing this water under the boat bottom and emitting a multiplicity of small streams in parallel line flow in the wake of the boat to thereby minimize turbulence in the wake.

Another object of this invention is to provide a multiplicity of runners, preferably, not less than four or five to cause the boat to raise on its runners at relatively low speeds and to protect occupants in the boat because of the increased stability should the boat hit underwater obstructions.

A principal object of this invention, is to provide a vehicle bottom which upon being loaded and propelled along a water surface has an increased effective lift area responsive to upward force reactions and distributes the load along the length of the vehicle bottom thereby enabling immediate compensation of an unequal load on the bottom.

Still another object of this invention is to provide on the boat bottom a number of longitudinally extending channels or grooves, preferably not less than three or four, to absorb a portion of the energy imparted to the water against runners on the boat bottom and thereby diminish turbulence in the wake of the boat or water vehicle.

A further object of this invention is to provide extensions rearward of a drive propeller on the boat to react with the helical and annular water turbulence created by the propeller and other force reactions to hold the forward end of the boat in contact with the water surface at all speeds.

A still further object of this invention is to provide a boat bottom construction capable of uniformly distributing loads accruing from forces acting upon the bottom of the relatively stable and cheap light weight boat bottom construction in terms of horse power per mass.

Yet another object of this invention is to provide a boat bottom construction for boats which is capable of uniformly distributing forces applied thereagainst and thereby obtain a lower center of gravity in terms of comparable length, width and horse power ratings of other boats.

Yet a still further object of this invention is to provide a new and improved method of planing a water vehicle and specifically a vehicle bottom for a boat and the like.

A feature of this invention relates to my novel method of constructing a vehicle bottom for a boat and the like.

A principal feature of this invention relates to the provision of a vehicle bottom including tail extension having alternating runners and channels running substantially the length of the bottom such that when the bottom is loaded and propelled along a water surface the effective lifting area responsive to upward force reactions is increased all to the end of distributing the load and permitting the vehicle bottom to be planed on the water surface at the lowest possible forward speed.

The instant vehicle or boat bottom lends itself to being economically manufactured from metal stampings, extruded or rolled metal or plastic on a large production scale.

Other objects and features of the present invention will more fully become apparent from the following detailed description taken in conjunction with the accompanying drawings illustrating several embodiments thereof, and in which:

Figure 1 is a plan view of my novel water vehicle;

Figure 2 is a cross sectional view taken substantially on the line II—II of Figure 1 looking in the direction of the arrows;

Figure 3 is a front elevation of my novel water vehicle;

Figure 4 is a rear elevation of my novel water vehicle;

Figure 5 is an enlarged fragmentary view of a portion of my boat bottom having V-shaped runners in water in a static position;

Figure 6 is an enlarged fragmentary detailed view of a portion of my novel boat bottom having V-shaped runners showing them dynamically planed on a water surface;

Figure 7 is an enlarged cross sectional view of a modified boat bottom construction without a deck having runners arcuate in cross section;

Figure 8 is an enlarged fragmentary view of still another modified boat bottom construction;

Figure 9 is an enlarged fragmentary view of still further modified boat bottom construction;

Figure 10 is an enlarged fragmentary view of yet another modified boat bottom construction;

Figure 11 is a diagrammatic fragmentary side elevation of the water vehicle or boat of Figures 1–6 showing the coaction between a power driven propeller and extensions on a rear end of my boat;

Figure 12 is a fragmentary bottom view of the structure shown in Figure 11;

Figure 13 is an enlarged fragmentary detailed view of a modified runner construction;

Figure 14 is an enlarged fragmentary view of still another modified runner construction;

Figure 15 is an enlarged diagrammatic side elevation of the water vehicle or boat of Figures 1–6 showing by arrows the equal distribution of a load along the length of the vehicles;

Figure 16 is an enlarged diagrammatic view of one of the runners on the boat in Figure 15 showing by an arrow the effective lift area;

Figure 17 is a diagrammatic view similar to Figure 15 showing by arrows the boat with an uneven load distribution;

Figure 18 is a diagrammatic view of one of the runners shown in Figure 17 showing by arrows how the effective lift area is increased upon which upward force reaction may react;

Figure 19 is an enlarged fragmentary bottom view of the runner shown in Figure 16;

Figure 20 is an enlarged fragmentary cross-sectional view of the runner in Figure 18 with the portion of the runner below the water surface deleted;

Figure 21 is an enlarged fragmentary cross-sectional view of the boat bottom shown in Figure 17 with portions of the runners below the water surface deleted;

Figure 22 is a side elevation of a modified boat bottom construction; and

Figure 23 is a cross-sectional view taken substantially on the line XXIII—XXIII of Figure 22 looking in the direction indicated by the arrows.

As shown on the drawings:

The reference numeral 10 indicates generally my water vehicle or boat, one form of which is shown in Figures 1–6, 11–12, and 15–21. The water vehicle or boat 10 includes my novel bottom 11. The bottom 11 is comprised of a plurality of transversely adjacent longitudinally extending runners 12 which are here shown as being V-shaped in cross section. Each of the runners 12 may be tubular and are suitably connected to one another. If the runners 12 are tubular then they are each formed as water tight buoyant compartments. It will be noted that each runner has a relatively flat surface 12′ with the surfaces 12′ together defining a deck.

Each pair of runners 12 together define therebetween a longitudinally extending channel or groove 13. For optimum results and preferably, a minimum of four or five of the runners 12 and three or four of the grooves 13 are utilized in the construction of the vehicle bottom 11.

The bottom 11 which is made up of a multiplicity of runners 12 has a deck 14 upon which is positioned at longitudinally spaced intervals seats 15 upon which passengers may sit. Connected to the boat bottom at suitable intervals and on opposite sides running the length thereof are hand rails 16 which serve to aid in getting into and out of the boat.

As will be noted from the plan view in Figure 1 illustrating one form of my invention, some of the runners 12 are elongated with respect to other of the runners 12. Provided at the rear end of the shorter intermediately located runners 12 is an outboard motor mounting or transom 17 which is adapted to carry an outboard motor M with a propeller P (see Figures 11 and 12).

In view of the foregoing description, it will be appreciated that the runners 12 are adapted to run substantially the full length of the water vehicle or boat 10 and the runners are at their forward ends curved or arcuately swept upwardly at the front or bow for the purpose of separating and directing water into the channels 13. As seen in Figure 1 there are shown nine runners 12 and eight grooves or channels 13 with the runners each being V-shaped and the channels each being in an inverted V-shape.

In view of the foregoing discussion it will be perceived that I have provided a unitary buoyant vehicle bottom structure 11 which may be compartmented transversely in a plurality of longitudinally extending sealed tubular compartments or runners parallel each to the other in a plane longitudinal of the vehicle. The upper surface 12′ of each of the vehicle runners 12 is generally flat constituting the deck 14. Bottom surface 18 of the bottom 11 is formed to provide a multiplicity of inverted channels 13 into which water at the forward end of the bottom is directed, as the device is moved forward, and confined in the respective channels 13 along the length of the bottom surface 18 which is in contact with the water. Apices of runners 12 constitute reduced cross sectional surfaces upon which the vehicle 10 is lifted at predetermined rate of forward motion. Disregarding water which is dividing would flow outwardly of the transversely outer runners 12 and considering only the water over which the bottom 11 passes when in motion, all head water resulting from the draft of the vehicle 10 can divide and move through the channels 13.

In Figure 5 is shown an enlarged view of a portion of the boat bottom 11 with the runners 12 shown in a static buoyant position relative to a water surface 20. It will be noted that a portion **12*a* below the water surface 20 represents the draft of the vehicle 10. Arrows have been shown in Figure 5 to indicate that the runners 12 partially absorb the energy of the channeled water when the boat bottom is moved along the water surface 20. When the square inch area of the channel portions or groove portions 12*a*, above the water surface 20 is equal to or greater than the square inch area of the portions 12*a* below the water surface then channeling exists sufficient to accommodate any head of water resulting from the draft of the vehicle 10**.

As forward motion is begun it is gradually increased until the load of the vehicle 10 is lifted in accordance with the resolution of the force accruing from the energy resulting from the forward motion of the device 10 and the effective application angle between the water and the runners including the upswept bow until a condition is reached where the resolution of the force applied only to the runners equals the load. The device 10 has in the course of reaching the aforesaid condition changed its means of support from buoyancy accruing from the displacement of water, to essentially total support due to the reaction of a force or forces. As the speed of the vehicle 10 is increased along the water surface 19 the vehicle is caused to rise higher and higher on its runners 13 until the tips of the runners are gliding along near or on the water surface 19 as shown in Figure 6. During this stage of operation, the vehicle 10 is fully planed upon its runners 12.

The height at which the device runs with respect to the water level simply changes as the requirement for support due to displacement is lessened. It will be appreciated that at a given load the height of the vehicle 10 with respect to the water surface 19 is proportion to the pounds force exerted by the power source.

Ordinarily there is no need to completely channel all of the head water under conditions of slow forward motion of the vehicle. Upon increased forward motion of the vehicle, the head water is controlled, broken up, divided and channeled in the channels 13 defined between the runners 12. In so doing, the flow of the water under the bottom 11 against the surface 18, as is exemplified by the arrows in Figure 6, create a lifting force. In addition, lateral motion of the channeled water is reduced since the grooves absorb a portion of the energy imparted to the water when it is set into motion (Figures 5 and 6). Such energy absorption results in forces acting to lift the device and absorption by the runners can occur along the total length of the channels. Then as the vehicle emits the channeled water from its stern, a multiple straight line flow occurs and results in diminished, side, lateral, or angular effect usual in the wake of boats which is commonly so disturbing to other boats, swimmers, fisherman and the like. Hence, it will be appreciated that during low speeds a substantial portion of the head water is channeled while at high speeds substantially all the head water is channeled. The speed at which the channeling occurs may be controlled by the effective angles of the runner cross section.

As a result of utilizing a plurality of transversely spaced longitudinally extending runners it will be appreciated that lateral stability of the boat is greatly increased. Still further, the runners 12 may be either of a solid or tubular construction and in either case may be made from a relatively light weight material such as aluminum and the like, or each of the runners may comprise an extruded plastic runner. If the runners are tubular, they are preferably formed into water tight sealed compartments and may render the boat or vehicle virtually unsinkable.

In Figures 11 and 12 a further feature of the vehicle 10 is diagrammatically shown. It will be noted that corresponding numerals have been used wherever applicable to identify corresponding elements. In this instance, the vehicle 10 has an outboard motor M mounted on the motor mounting 17. The motor M has a propeller P which has a propeller thrust line L substantially parallel with the bottom of the boat. This thrust line is shown in Figure 11.

Figure 12 shows the water vehicle 10 as having an insert I suitably joined to the boat bottom 11 to increase the effective square inch area against which helical propeller turbulence T may react to effect a force acting at a moment that rotates, or tends to maintain the bow of the boat in continued engagement with the water surface when the vehicle is placed in the water. In other words, by providing extensions to the rear of the transom 17 of the type shown in Figures 11 and 12 against which propeller turbulence may effectively react, the bow of the boat may be at all times maintained in its relative position on the water surface.

Tests of a boat, embodying the principles of my invention as shown in the instant drawings were made. It was found that when the boat struck 15 to 18 inch high wakes normal to the forward direction of the boat which with a full 30 horse power being applied to the light weight aluminum boat, it resulted in the front end of the boat snapping up not more than 3 inches and being immediately afterward leveled with the water at the stern of the boat. It was also found a cross wake does not cause the boat to raise from the surface of the water.

By virtue of this construction, and employing relatively long tail extensions which preferably are in the form of runners, porpoising or raising up of the bow of the boat from the water is substantially prevented. By this boat bottom construction a high horse power may be applied to the instant boat with weights no longer required to be placed in the bow of the boat to maintain or hold the boat in the water. Thus, the boat may be substantially maintained in the water at a relatively level plane by design.

Figures 15–21 illustrate the effective area variability of my boat 10 when it is loaded under varying conditions. The boat 10, in Figures 15 and 16, is shown as being planed on the water surface 19 with the equal length arrows indicating the balanced loading of the boat or vehicle. At this time, the upward force reactions are acting on the bottom of the runners along the surfaces which are in contact with the water. Figure 16 shows one of the boat runners of Figure 15 being planed substantially on its tip with Figure 19 highlighting the total area which is being acted against by the upward force reactions, as indicated by the lone arrow in Figure 16. The equally distributed load of the boat in Figures 16, 17, and 19 is being supported by the energy imparted through the media and the per square inch counter action or reaction forces upon the effective water foil or lift surfaces at and beneath the water surface 19.

Figures 17, 18, 20 and 21 show the boat 10 when the load applied is unbalanced at the stern. This unbalanced loading, as identified by the varying lengths of the arrows in Figure 17, may be brought about by either an unbalanced loading before or after the boat is set in motion and is compensated by a per square inch counter action upon the runners 12. To this end, by utilizing extensions at the stern of the boat (Figures 15, 17 and 21) the effective moment is extended and the effective area is increased. The increased effective area being acted upon by upward force reactions is best seen in Figures 18, 20 and 21. Figures 20 and 21 demonstrate how the runners are more submerged at the stern than at the forward point of contact between the boat and the water surface 19. Thus when my vehicle is loaded rearwardly more lift or runner area is brought into effective application producing immediate compensation, of an unequal load. The instant boat bottom construction is contrasted with conventional type boat bottoms where substantially at all times essentially the same square inch area is in contact with the water media and where the sudden application of an increased loading to the rear of the boat simply forces the same lifting surface further into the water and therefore does not increase the effective lifting area.

While I have shown the extension features to be applicable to a boat utilizing an outboard motor it will be understood that this same principle is applicable to a boat having an inboard motor where the propeller thrust line is substantially co-planar with the bottom of the boat in order that propeller turbulence may be effectively directed against the extensions sufficient to hold the bow in contact with the water.

In Figure 7 is shown a modified vehicle bottom construction 21 having a plurality of tubular runners 22 each of an arcuate cross section. Adjacent runners here again cooperate to define channels 23 between same. In the present instance each of the runners 22 is formed contiguous to an adjacent runner to provide a series of longitudinally extending parallelly aligned runners. The runners 22 are closed along the runner surface to be engaged upon the water and are open in the enclosed interior of the bottom of the vehicle.

In Figure 8 is shown still another boat bottom 31 which has a series of modified V-shaped runners 32. Each of the adjacent runners 32 cooperate and define together a channel 33 when in assembly.

The runners 32 include a V-shaped bottom portion 34, relatively flat vertically extending side portions 35, and a relatively flat top surface portion 36. In assembly, the surface portions 35 of each of the adjoining runners 32 when in abutting relation, are adapted to be welded together. The top surface portions 36 combine together to form a deck 37. The runners 32 are shown as being tubular and accordingly require end cap 38 to compartmentalize the runner and render same water tight and buoyant.

The runners 22 and 32 shown in Figures 7 and 8 may constitute either extruded or conformed metal shapes and are preferably arcuate in one instance and tubular in the other instance to reduce the weight of the overall structures.

In Figure 9 is shown still another modified boat bottom construction 41 having a series of runners 42 with adjacent runners defining channels 43. In this instance, the runners may be roller conformed metal, press-brake formed metal, or thermoformed plastic sheet.

The runners 42 include a V-shaped tip runner portion 44, vertically extending side portions 45, and a top portion 46 which is suitably attached and connected at opposite ends with the sides 45. In assembly with one another, the sides 45 are suitably connected to adjoining runners. To render the tubular runners 42 buoyant, they are made water tight by closing the ends of the runners by means of caps 47.

Shown in Figure 10 is still another modified boat bottom 51 made up of a series of interconnected runners 52 with each of the adjacent runners defining a channel 53. In this instance it will be noted that the runners 52 are hemispherical in configuration. These runners may be made from metal, plastic or other suitable material. It will be noted that top surface 54 of each of the runners 52 are in alignment with one another defining a deck 55.

All of the modified boat bottoms 21, 31, 41 and 51 are adapted to perform in much the same manner as the boat bottom 11 shown in the first form of my invention (Figures 1–6).

In Figure 13 is shown still another modified runner 62 which may be utilized in any one of the boat bottoms of the types previously disclosed herein. The runner 62 is of a tubular construction and has a series of inserts 63 lodged within at spaced intervals along the length of tubular cavity 64 defined by the runner. By providing spaced inserts 63 in the runners 62, it will be appreciated, the runners are each further compartmented such that a boat having nine sealed water tight buoyant tubular runners may be readily and logically provided with three or more inserts in each runner to thereby further compartmentalize each runner and the boat bottom into thirty-six sealed compartments. Such a construction would be virtually unsinkable with respect to the piercing of sufficient compartments should an impact force be applied against the boat bottom compartmented runners.

In Figure 14 is shown still a further modified runner 72 which has a central tubular cavity 73 which is filled with foam rubber 74 or other suitable buoyant material. If the sealed tubular runner 72 is pierced, the foam rubber or suitable buoyant material would tend to keep the runner afloat.

In Figures 22 and 23 is shown a modified boat bottom construction 81 capable of being made from plastic material such as a poly-ester resin and fiber-glass mat layup. The bottom includes a series of V-shaped runners 82 and inverted V-shaped channels 83. The V-shaped runners 82 and channels 83 run the length of the bottom in parallel alignment with the transversely outside runners having inclined integral side panels 84 to lend a streamlined hydrodynamic appearance to the boat bottom 81. The panels are tapered from the bow where they have the largest vertical dimension to the stern where they have the smallest vertical dimension.

It will be understood that modifications and variations may be effected without departing from the scope of the novel concepts of the present invention.

I claim as my invention:

In a water vehicle adapted to be planed on water, a hull including a bottom curved upwardly at the vehicle bow, a deck and a rear transom for carrying a motor driven propeller at the bottom adjacent the vehicle stern and with the sides of the bottom extended rearwardly from the transom at the vehicle stern, said boat bottom having longitudinally extending transversely spaced downwardly opening channels defined below said deck by downwardly depending longitudinal closely spaced ribs the tips of which carry the load of the vehicle in planing, said extended bottom rearwardly of said transom comprising two transversely spaced extensions at opposite sides of said transom, said extensions having continuations of some of said channels and ribs to force the boat stern upwardly and the bow downwardly to effect planing of the boat in response to forward thrust of the boat in the water, and said boat bottom forward of said transom having a multiple of said ribs with the channels defined at each of the outer sides of the boat discharging fluid through the channels of said extensions and with the middle channels between the side channels discharging fluid at said transom between said extensions as the boat is planing on the tips of said ribs.

References Cited in the file of this patent

UNITED STATES PATENTS

| | | |
|---|---|---|
| 1,154,471 | Wolcott | Sept. 21, 1915 |
| 1,169,947 | Forse | Feb. 1, 1916 |
| 1,226,699 | Saunders | May 22, 1917 |
| 2,666,406 | Babcock | Jan. 19, 1954 |
| 2,735,392 | Cox | Feb. 21, 1956 |
| 2,744,267 | Roby | May 8, 1956 |

FOREIGN PATENTS

| | | |
|---|---|---|
| 498,214 | Great Britain | Jan. 9, 1939 |
| 575,516 | Great Britain | Feb. 21, 1946 |
| 657,488 | Great Britain | Sept. 19, 1951 |
| 743,893 | Great Britain | Jan. 25, 1956 |